(12) United States Patent
Heap et al.

(10) Patent No.: US 12,568,259 B2
(45) Date of Patent: Mar. 3, 2026

(54) SYSTEMS AND METHODS FOR HYBRID DELIVERY OF MULTICAST VIDEO CONTENT

(71) Applicant: Imagine Communications Corp., Plano, TX (US)

(72) Inventors: Graham Andrew Heap, Godalming (GB); Emma Quinn, Guildford (GB); Robert David Malcolm, Elgin (GB); Thomas Huxter-Freer, Kingston upon Thames (GB)

(73) Assignee: IMAGINE COMMUNICATIONS CORP., Plano, TX (US)

( * ) Notice: Subject to any disclaimer, the term of this patent is extended or adjusted under 35 U.S.C. 154(b) by 80 days.

(21) Appl. No.: 18/889,317

(22) Filed: Sep. 18, 2024

(65) Prior Publication Data

US 2025/0324110 A1 Oct. 16, 2025

Related U.S. Application Data

(60) Provisional application No. 63/633,421, filed on Apr. 12, 2024.

(51) Int. Cl.
| | |
|---|---|
| *H04N 21/234* | (2011.01) |
| *H04N 19/46* | (2014.01) |
| *H04N 21/6405* | (2011.01) |
| *H04N 21/81* | (2011.01) |

(52) U.S. Cl.
CPC ....... *H04N 21/23424* (2013.01); *H04N 19/46* (2014.11); *H04N 21/6405* (2013.01); *H04N 21/812* (2013.01)

(58) Field of Classification Search
CPC ................................................ H04N 21/23424
See application file for complete search history.

(56) References Cited

U.S. PATENT DOCUMENTS

| | | |
|---|---|---|
| 2016/0182923 A1 | 6/2016 | Higgs et al. |
| 2018/0343495 A1* | 11/2018 | Loheide ............... H04N 21/435 |
| 2021/0337254 A1 | 10/2021 | Lykes et al. |

OTHER PUBLICATIONS

Extended European Search Report for European Patent Application No. 25170440.9, dated Aug. 27, 2025, 8 pages.

(Continued)

*Primary Examiner* — Michael H Hong
(74) *Attorney, Agent, or Firm* — Norton Rose Fulbright US LLP

(57) ABSTRACT

A video processing system for dynamic hybrid delivery of video is provided. The system includes a processor and a non-transitory data storage device storing a set of instructions, when executed by the processor, causes the system to: obtain a temporal data file indicating a start time and an end time for a video stream and one or more timing references, each of the timing references indicating a respective position in the video stream for advertisement placement; obtain a plurality of advertisement orders; generate, based on the temporal data file, a video configuration log file for dynamic insertion of one or more of the plurality of advertisement orders into the video stream; process the video stream using a video encoder to generate a transport stream based on the video stream; and generate a video output feed using the transport stream and the video configuration log file.

20 Claims, 4 Drawing Sheets

(56)        References Cited

OTHER PUBLICATIONS

International Telecommunication Union, ITU-T, Series J: Cable
Networks and Transmission of Television, Sound Programme and
Other Multimedia Signals—Digital transmission of television signals—
Part 1; Digital Program Insertion Cueing Message for Cable—
Amendment 1: Recommended Practice for ITU-T J.181, Sep. 2014,
70 pages.
DASH Industry Forum, "Guidelines for Implementation: Ad Inser-
tion in DASH," Version 0.9, 3rd Generation Partnership Project
(3GPP); Retrieved from the Internet: http://www.3gpp.org/ftp/tsg_
sa/WG4_COD EC/TSGS4_82/Docs/; Sep. 2014, 31 pages.

* cited by examiner

SYSTEMS AND METHODS FOR HYBRID DELIVERY OF MULTICAST VIDEO CONTENT

CROSS-REFERENCE

This application claims priority to U.S. Provisional Patent Application No. 63/633,421 titled SYSTEMS AND METHODS FOR HYBRID DELIVERY OF MULTICAST VIDEO CONTENT, filed on Apr. 12, 2024.

FIELD

Embodiments generally relate to the field of producing, managing and streaming video content. More specifically, embodiments relate to systems and methods for processing and delivery of video content with dynamic delivery of advertisements.

INTRODUCTION

As premium video consumption moves from traditional broadcast delivery infrastructures, which include for example, delivery via air/satellite/cable infrastructures to televisions, to real time, dynamic consumption of streamed video content by users using various devices over the internet in real time, advertisements ("ad" or "ads") displayed in such dynamic delivery of video content have become less efficient and less effective when delivered using a standard approach.

Current state of art advertisement technologies, for example, unicast server-side ad insertion ("SSAI"), tend to cause a substantial amount of costs for advertisers when placing advertisement orders, due to the large number of impressions required to reach a wide audience. SSAI is a process used to insert ads into a single digital video stream, where the server stitches an ad directly into the video content. Where advertisers desire broad reach spots hitting large geographical regions, or even the entire audience, the same decisions of ads are usually made (and charged for) multiple times.

SUMMARY

In an aspect, there is provided a computer-implemented video processing system for hybrid delivery of multicast video content, enabling real time delivery of ad impressions dynamically inserted into the video content. Instead of relying on broadcast traffic, scheduling and playout/distribution infrastructure (or an over-worked and expensive unicast server making many duplicate responses) to perform regional or local variation, in some example embodiments described herein, the system places and delivers ads using a single transport stream (the 'broadcast feed'), followed by multiple manifest manipulations performed in serial.

A multicast video content generally means a video content delivered in an one-to-many manner, that is, the same video may be delivered to multiple viewing devices. A multicast ad delivery also refers to the same advertisement being delivered to multiple viewing devices.

Some non-limiting example advantages of the example embodiments include: 1) substantially lower cost and complexity than the standard approach alternatives. The ad decisions for the multicast cohorts (which are the same for all viewers in that cohort) are requested and made once, and charged only once; and 2) greater flexibility to change the granularity of the multicast cohorts: for example, with a traditional approach, if a user sets a regional playout at a zone level, then subsequently tries to change, combine, or split zones into smaller zones, it would require a root and branch re-configuration of the broadcast technology. Similarly, if the user only has a broadcast feed and wants to sell advertising at a more granular level, it would be very difficult and costly to implement as all systems in the video processing chain would need to be adapted. Using the embodiments described herein, a user can set or modify zones without requirement of a root and branch re-configuration.

In one aspect, a computer-processor-implemented video processing system is implemented, the system may include: a processor; a non-transitory data storage device storing a set of instructions, when executed by the processor, causes the system to: receive or obtain a temporal data file indicating a start time and an end time for a video stream and one or more timing references, each of the timing references indicating a respective position in the video stream for advertisement placement; receive or obtain a plurality of advertisement orders; generate, based on the temporal data file, a video configuration log file for dynamic insertion of one or more of the plurality of advertisement orders into the video stream; process the video stream using a video encoder to generate a transport stream based on the video stream, the transport stream comprising one or more data markers for placements of one or more advertisements; and generate a video output feed using the transport stream and the video configuration log file.

In some embodiments, the one or more data markers comprise Digital Program Insertion Cueing Message for Cable (SCTE) 35 markers.

In some embodiments, in response to the one or more data markers, a broadcast manifest is updated to include one or more advertisement placements within the video output feed.

In some embodiments, the system may add additional information, such ad data packets or data values to the data markers, or to other components in the broadcast manifest, in order to embed contextual information representing intelligence to improve decision making with respect to ad selection and placements.

In some embodiments, the system may include a multicast manifest manipulator unit and wherein the broadcast manifest is configured by the multicast manifest manipulator unit. The broadcast manifest, after configuration or update by the multicast manifest manipulator unit, may be stored as a multicast manifest.

In some embodiments, the multicast manifest manipulator unit is only called a number of times equal to a number of target aggregate audience groups.

In some embodiments, the system may include a unicast manifest manipulator unit and wherein the broadcast manifest is configured by the unicast manifest manipulator unit.

In some embodiments, the system may include a video delivery system for dynamic delivery of the video output feed using the broadcast manifest.

In some embodiments, the video delivery system is configured to display one or more of the plurality of advertisement orders in the video output feed based on the broadcast manifest.

In some embodiments, the multicast manifest manipulator unit, in response to the one or more data markers, is configured to make an IAB Video Ad Serving Template (VAST) or Video Multiple Ad Playlist (VMAP) ad request.

In some embodiments, the multicast manifest manipulator unit is configured to update the broadcast manifest based on one or more advertisement selections received in response to the IAB VAST or IAB VMAP ad request.

In another aspect, there is provided a computer-process-implemented method for video processing, the method may include: receiving or obtaining a temporal data file indicating a start time and an end time for a video stream and one or more timing references, each of the timing references indicating a respective position in the video stream for advertisement placement; receiving or obtaining a plurality of advertisement orders; generating, based on the temporal data file, a video configuration log file for dynamic insertion of one or more of the plurality of advertisement orders into the video stream; processing the video stream using a video encoder to generate a transport stream based on the video stream, the transport stream comprising one or more data markers for placements of one or more advertisements; and generating a video output feed using the transport stream and the video configuration log file.

In some embodiments, the one or more data markers comprise Digital Program Insertion Cueing Message for Cable (SCTE) 35 markers.

In some embodiments, in response to the one or more data markers, a broadcast manifest is updated to include one or more advertisement placements within the video output feed.

In some embodiments, the broadcast manifest is configured by a multicast manifest manipulator unit.

In some embodiments, the multicast manifest manipulator unit is only called a number of times equal to a number of target aggregate audience groups.

In some embodiments, a unicast manifest manipulator unit is used to configure the broadcast manifest.

In some embodiments, dynamic delivery of the video output feed is executed using the broadcast manifest.

In some embodiments, the method includes displaying one or more of the plurality of advertisement orders in the video output feed based on the broadcast manifest.

In some embodiments, the multicast manifest manipulator unit, in response to the one or more data markers, is configured to make an IAB Video Ad Serving Template (VAST) or Video Multiple Ad Playlist (VMAP) ad request.

In some embodiments, the multicast manifest manipulator unit is configured to update the broadcast manifest based on one or more advertisement selections received in response to the IAB VAST or IAB VMAP ad request.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
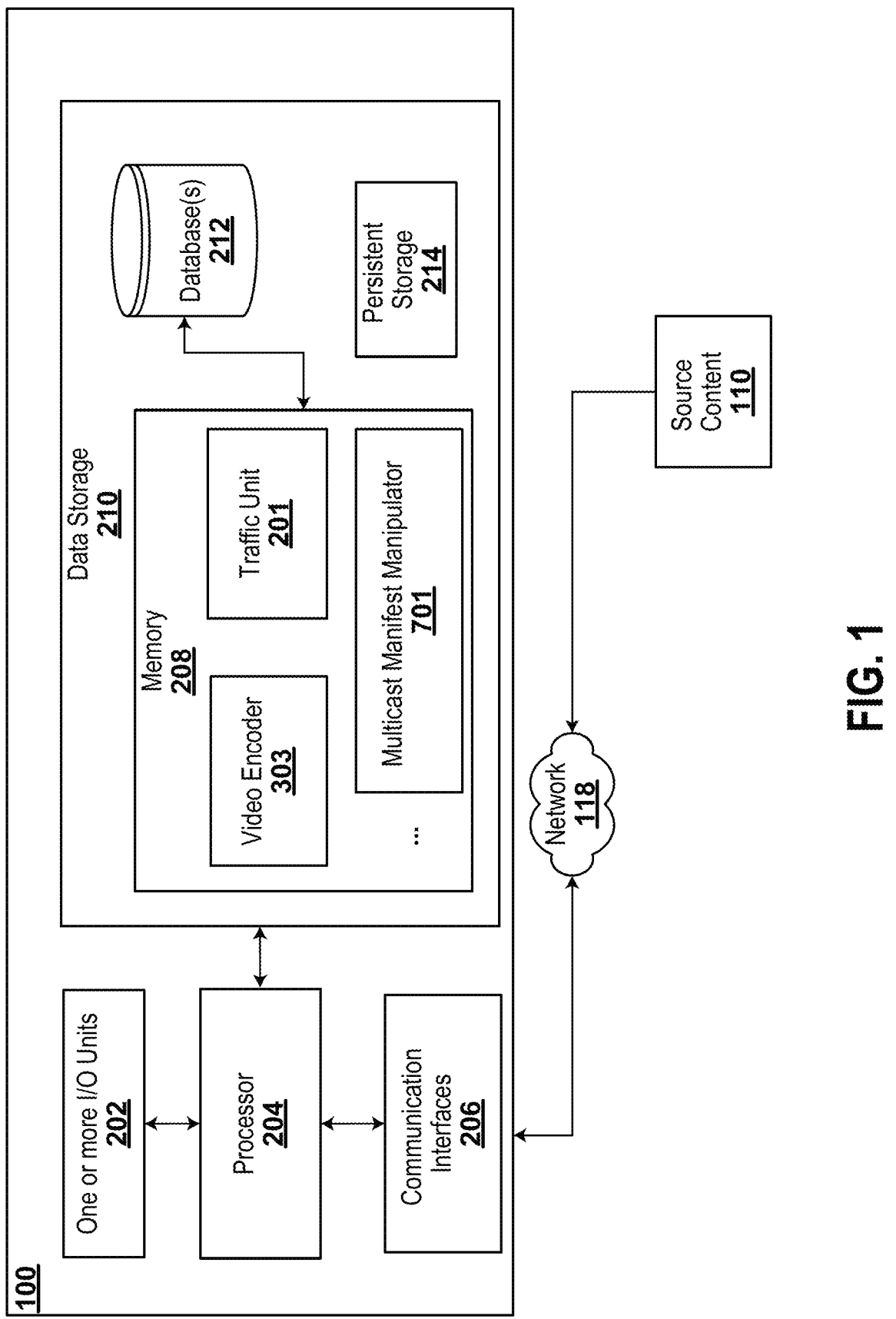
FIG. 1 is a block diagram of an example video processing system in accordance with one embodiment.

Throughout the following discussion, numerous references may be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The term "connected" or "coupled to" may include both direct coupling (in which two elements that are coupled to each other contact each other) and indirect coupling (in which at least one additional element is located between the two elements).

Throughout the disclosure, the term "video" may be used to describe moving pictures, associated audio and accompanying metadata. That is, a video may be inclusive of video data, audio data, metadata, and/or any other embedded data.

Generally, advertisements may be categorized as linear, linear addressable, or video on demand (VOD). Linear advertisements or linear control advertisements may refer to advertisements that are programmed or scheduled to be broadcasted to an audience at scheduled times, such as a traditional TV commercial set to air at 7 PM on TV.

Linear addressable advertisements may refer to advertisements that cater to individual audiences, based on available measurement data and signals, such that the advertisement contains a more relevant message to the individual audience. Linear addressable advertisements may be personalized based on real time or near real time data signals from the device used to stream the video content delivering the advertisement. Such data signals may include data representing user preferences, past behaviours and demographics, as non-limiting examples.

VOD advertisements may refer to advertisements placed within video programs or clips, such as advertisements shown at the beginning of a free video shown on You-Tube™.

A temporal schedule can include timing references used to direct when certain events, ads, fragments or other portions of a video are located temporally in a stream (e.g., to delay an ad by 2 seconds). In some embodiments, timing references are implemented to enable the manipulation of time in order to meet the output (delivery) requirements. Content can be delivered by reference either through a dependent proxy file, or through description in a playlist or manifest. When content is delivered by reference, the system can request for the content from a remote server at that reference before it receives the actual content. Content can be delivered by any number of protocols such as ftp, http, or other protocol in a timing manner where the result is indistinguishable from live. Content can be delivered by any number of protocols such as ftp, http, or other protocols in a manner that emulates a file delivery. Content can be provided as encrypted or unencrypted.

In an embodiment, one or more temporal schedules or playlists can be generated and then ingested by the video processing system 100, when appropriate or required. The temporal schedules or playlists may facilitate dynamic creation of streams with alternate content that may be targeted to a subset of distribution, as well as signaling the insertion of metadata (such as the location of program and advertisement boundaries) into the production stream.

FIG. 1 illustrates a block diagram of an example video processing system 100 in accordance with some embodiments, which can be referred to as system or platform 100. The system 100 is configured to dynamically process video content by dynamically inserting ad placements using a hybrid approach in a multicast delivery infrastructure.

The system 100 can include one or more I/O units 202, processors 204, communication interfaces 206, and data storages 210. A processor 204 can execute instructions in memory 208 to implement aspects of processes described herein. The one or more processors 204 can execute instructions in memory 208 to configure video encoder and packager unit 303, traffic unit 201, playout engine 301, multicast manifest manipulator 701, and other functions, which are described next with reference to FIG. 2. Only a few components are illustrated in FIG. 2 for clarity, however, one or more additional components may be implemented within system 100 as described herein.

Figure 2:
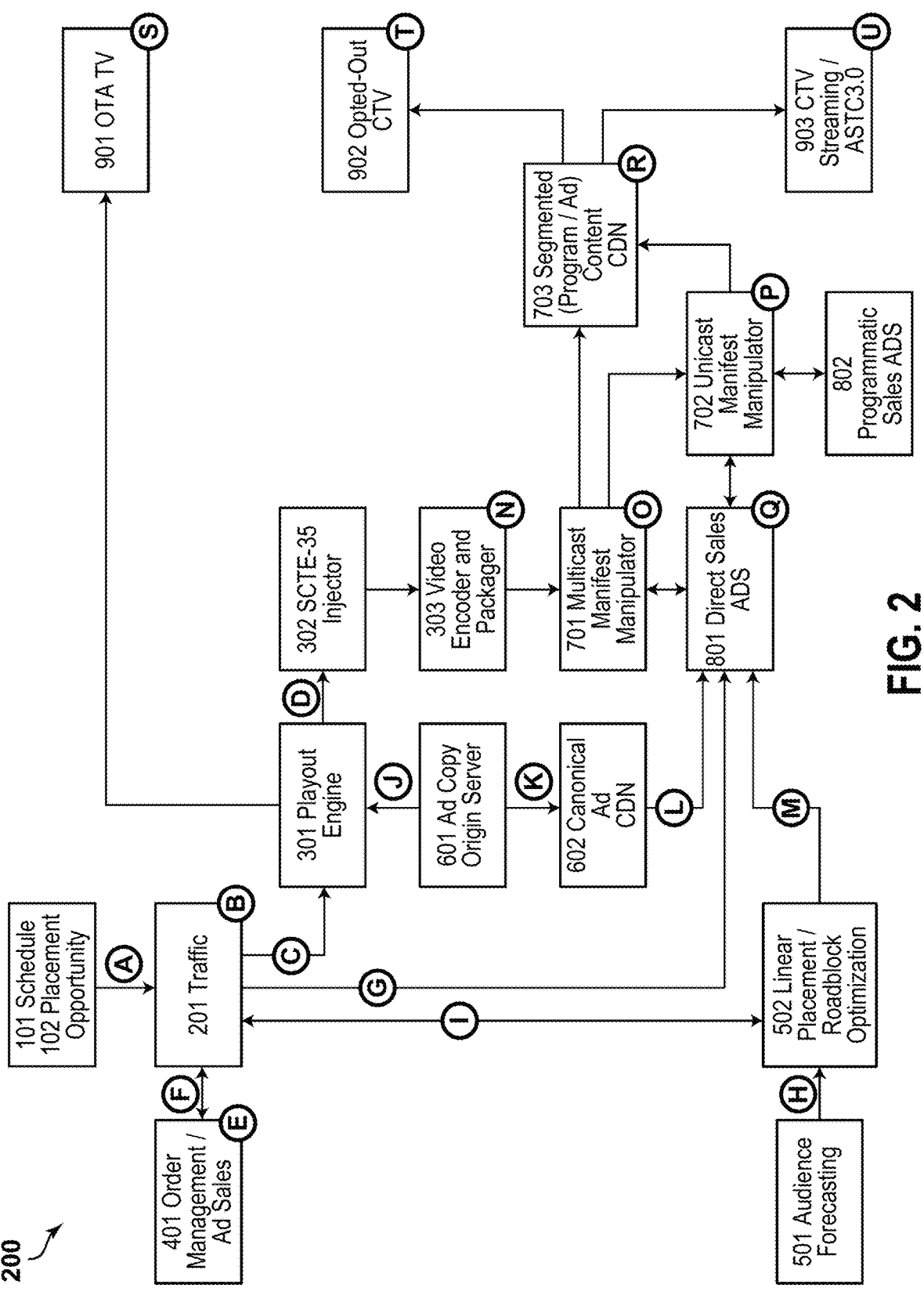
FIG. 2 illustrates an example process of hybrid delivery of multicast video content in accordance with one embodiment.

FIG. 2 demonstrates an example process 200 of hybrid delivery of multicast video content using system 100 in accordance with some embodiments. A temporal schedule 101 is generated, which includes a playlist (also referred to as a schedule) for a video channel, including primary audio/video events, interstitial breaks, and secondary events. Placement opportunity data 102 includes signals indicating a specific position in the playlist or schedule, which is available for advertising to be inserted. Traffic unit 201 includes a sub-system for planning placement of advertisements in the linear stream of origination. The traffic unit 201 is also used to indicate which placement opportunities can be used for linear addressable placements of advertisements.

A playout engine 301 includes a sub-system that stores advertising assets (audio/video files) and the playlist, then automates the origination of the channel according to said playlist. Playout engine 301 is executed for the automation and playout of a channel according to the playlist.

A SCTE-35 injector unit 302 may operate to place or inject SCTE-35 triggers into the transport stream for the channel.

A video encoder and packager unit 303 includes a subsystem that converts the video output of the playout engine 301 to a transport stream and embeds the SCTE-35 markers. The video encoder and packager unit 303 may include one or more encoders or transcoders used to convert a source content 110 into a format suitable for dynamic hybrid video delivery. The one or more encoders or transcoders may be used to insert ads, text and graphic overlays into the video stream, when their content and timing is known in advance, or just-in-time when the overlays are known at the playout time. The insertion based on manifests/playlists can be received from the playlist and subsequent (downstream) substitutions happen in manifests. Lastly, the transcoder may also insert metadata into the video stream, such as captioning or other program data. Any manipulation of timing such as the synchronization of closed captioning to video content or the expansion of content length may also be handled within the video encoder and packager unit 303.

An order management/ad sales unit 401 includes a subsystem implemented to manage incoming orders for advertisements, which may be specified as spot/ratings or audience/impression.

An audience forecasting unit 501 is an input to linear advertisement placement/roadblock optimization unit 502.

An ad copy origin server 601 is a server that is used to originate (e.g., produce) the advertising assets (audio/video files).

A canonical ad content distribution network (CDN) 602 hosts one or more canonical ad asset files for distribution by an advertisement server (ADS), such as a direct sales ADS unit 801.

A multicast manifest manipulator unit 701 can include an insertion sub-system that populates the transport stream with broadcast ads based on a video configuration log file generated by the traffic unit 201. The video configuration log file may include one or more data markers indicating specific positions for potential advertisements.

A data marker can include a data signal used to identify a splice point or position, such as a temporal point, in a transport stream, for placement of additional content. For instance, a data marker can indicate a position for an advertisement placement or insertion, a program boundary, credits, chapters, blackouts, and so on.

In some embodiments, the one or more data markers can include, as an non-limiting example, Digital Program Insertion Cueing Message for Cable (SCTE) 35 markers.

The insertion sub-system within the unit 701 may populate the transport stream with broadcast ads based on a video configuration log file optimized to include linear control ads (from linear placement/roadblock optimization unit 502) for delivery to one or more Connected TV (CTV) units, such as an opted-out CTV unit 902. This component can be executed x times, where x is the number of target aggregate audience groups, such that the overall ad serving costs are substantially reduced.

A Connected TV (CTV) device refers to a device that is used to stream or watch video content over the internet on one or more applications or programs installed and executed within the device. This can include, for example, smart TVs, mobile devices, laptops, and game consoles. Usually, a CTV device delivers content to one or more users (audiences) on demand, in real time. CTV advertising allows companies to deliver highly relevant and engaging advertisements to the audiences. Companies are able to determine if an advertisement is effective, efficient or successful by monitoring or tracking various data signals indicating different measurements, such as, for example, video completion rate, automatic content recognition, and other metadata offered by cookies on the device.

A unicast manifest manipulator unit 702 may be implemented to populate the transport system with broadcast ads, which for example can be once for an entire channel, or once per regional zone if roadblocks are geo targeted versus once per user if using the unicast manifest manipulator unit 702. The unit 702 also can be a server-side ad insertion system that replaces broadcast ads in the transport stream with direct-sold targeted ads (from direct sales ADS unit 801) for delivery by CTV streaming/ATSC3.0 903 at the individual video stream level.

A direct sales ADS unit 801 may include an ad decision server, which responds in real-time to queries from the manifest manipulator units 701, 702 about which ad copy (from any of traffic unit 201, linear placement/roadblock optimization unit 502 and order management/ad sales unit 401) is to be displayed to one or more users in a linear addressable placement opportunity in a video stream.

A programmatic sales ADS unit 802 may include an ad decision server, which responds in real-time to queries from the unicast manifest manipulator unit 702 about which programmatically sold ad copy is to be displayed to one or more users in a placement opportunity in a video stream.

An Over-The-Air (OTA) Television (TV) unit 901 can display the channel output feed from the playout engine 301 with broadcast ads scheduled by the traffic unit 201. In a future state, where all content consumption is delivered through network-connected devices, this component and all associated transmission hardware and cost may be retired from the architecture, replaced in effect by an opted-out CTV unit 902.

The opted-out CTV unit 902 is a Connected Television (CTV) client that has opted out of one or more interest-based advertising. The opted-out CTV unit 902 can be caused to display the transport stream from the multicast manifest manipulator unit 701 with broadcast ads from traffic unit 201. The ads may be optimized based on the opt-out preferences associated with the opted-out CTV unit 902.

A CTV streaming/ASTC3.0 unit 903 is a Connected Television (CTV) client, which displays the transport stream from the unicast manifest manipulator unit 702 with direct-sold targeted ads (from direct sales ADS unit 801) and linear control ads from linear placement/roadblock optimization unit 502 and ad content selected by the programmatic ad sales ADS unit 802. Connected Television (CTV) refers to any TV that can stream video by connecting to the internet, such as smart TVs.

In some example embodiments, a temporal schedule file 101 is generated for a video channel. The temporal schedule 101 may include, for each program, signal data indicating a respective start time and a corresponding end time, for all programs, as well as one or more break structures, which may be indicated by data markers. Placement opportunities 102 are identified in the break structures. The generated temporal schedule is passed to the traffic unit 201 so that ads can be, when appropriate, placed or inserted into a video stream.

In some example embodiments, the traffic unit 201 receives instructions, data, and parameters from order management system 401 (e.g., campaign planning system) about ad orders for fulfillment. Traffic unit 201 implements and executes a multi-pass method to match ad orders with available placement opportunities 102 in the temporal schedule 101. Traffic decisions can be made based on: spot placement, which means an ad order is for a specific time or specific individual placement opportunity; and target audience, which means an order is matched to a placement opportunity based on a specific group of audience having certain target qualities or quantities.

In some example embodiments, the traffic unit 201 also tags specific playout opportunities as being available for addressable ads. For instance, the traffic unit 201 can generate a video configuration log file, which is passed to the playout engine 301 for execution. Any time a placement opportunity in the log file is marked as "addressable", the playout engine 301 signals the SCTE-35 injector to insert a trigger into the stream.

An addressable ad placement opportunity facilitates delivery of relevant messages to desired audiences based on available signals, regardless of presence of ad identifiers such as third-party cookies. This approach is key to reaching and gauging the effectiveness of online ad spaces, and in driving engagement and ad relevance.

In some example embodiments, the order management/ad sales unit 401 is implemented to sell ad inventory to a specific audience, resulting in a list of orders that must be fulfilled. The linear orders are sent to traffic unit 201 for execution.

In some example embodiments, linear addressable orders are sent to the direct sales ADS unit 801. Audience forecasts including linear advertisements are sent to linear placement/roadblock optimization unit 502. Impression orders are sent by the traffic unit 201 to linear placement/roadblock optimization unit 502. Linear placement/roadblock optimization unit 502 returns optimized pods to the traffic unit 201.

In some example embodiments, an ad copy is transferred to and prepared for the appropriate playout servers in the playout engine 301. The ad copy is replicated from the ad copy origin server 601 to the canonical ad CDN 602 for delivery via direct sales ADS unit 801.

In some example embodiments, direct sales ADS unit 801 references the ad copy URLs on the canonical ad CDN 602, as populated from the linear addressable orders sent from the traffic unit 201.

In some example embodiments, linear placement/roadblock optimization unit 502 delivers linear control spots to direct sales ADS unit 801.

In some example embodiments, the video encoder and packager unit 303 converts the video output of the playout engine 301 to a transport stream and embeds the SCTE-35 markers.

In response to the SCTE-35 markers in the transport stream, in some example embodiments, the multicast manifest manipulator unit 701 can generate and send an ad request to the ADS unit 801. For instance, as non-limiting example, an ad request can be an IAB Video Ad Serving Template (VAST) or Video Multiple Ad Playlist (VMAP) ad request. The response from the ADS unit 801 are placed into the broadcast manifest delivered from the playout engine 301. This component is called only the number of times equating to the number of target aggregate audience groups to substantially reducing the ad serving costs versus doing this using a unicast manifest manipulator unit 702 to achieve the same outcome (which for example could be once for the entire channel, or once per regional zone if roadblocks are geo targeted versus once per user if using unit 702).

The IAB VAST or VMAP can be, for example, a specification file in an XML template used to describe a structure for ad inventory insertion, to be executed by a video player or a content distribution system.

In response to the SCTE-35 markers in the transport stream, in some example embodiments, the unicast manifest manipulator unit 702 can make an IAB VAST/VMAP ad request to direct sales ADS unit 801. The response from direct sales ADS unit 801 is then included into a manifest delivered from the unicast manifest manipulator unit 702.

IAB VAST/VMAP ad requests are received by the direct sales ADS unit 801. Direct sales ADS unit 801 is configured to act upon requests to determine which ads should be presented to the viewer, for instance, for requests from the multicast manifest manipulator unit 701, direct sales ADS unit 801 may be configured to select ads based on direct sold broadcast insertion orders from the traffic unit 201. For another example, for requests from the unicast manifest manipulator unit 702, direct sales ADS unit 801 can be configured to select ads based on direct sold targeted insertion orders from the traffic unit 201, and linear control advertisements, which may include placements of linear control advertisements, from linear placement/roadblock optimization unit 502.

In some embodiments, the system may add additional information, such ad data packets or data values to the data markers, or to other components in the broadcast manifest, in order to embed contextual information representing intelligence to improve decision making with respect to ad selection and placements. For instance, the additional contextual information embedded within broadcast manifest or data markers can include the program being played, a current time or date, the genre of the programming, and so on. That contextual metadata is then passed along with one or more ad requests to an advertisement server such as the ADS 801 to enhance the ad decisioning capability.

Unicast and multicast feeds are delivered by the segmented content CDN unit 703 to CTV streaming/ASTC3.0 unit 903 and opted-out CTV unit 902, respectively.

Over-The-Air Television 901 is configured to display the video output, also referred to as the channel output feed, from the playout engine 301 with broadcast ads scheduled based on a broadcast manifest from the traffic unit 201 and optimized by linear placement/roadblock optimization unit 502. In some embodiments, where content consumption is exclusively through connected devices over networks (as opposed to traditional televisions), this component and all associated transmission hardware and cost may be retired from the architecture, replaced in effect by opted-out CTV unit 902.

Opted-out Connected Television (CTV) may be a client device 902 that displays the transport stream from the multicast manifest manipulator unit 701 with broadcast ads scheduled by the traffic unit 201 and optimized by linear placement/roadblock optimization unit 502. The opted-out CTV unit 902 is a Connected Television client that has opted out of one or more interest-based advertising. The ads may be optimized based on the opt-out preferences associated with the opted-out CTV unit 902.

Connected Television (CTV) client devices 903 may display the transport stream from the unicast manifest manipulator unit 702 with direct-sold targeted ads from direct sales ADS unit 801 and linear control ads from linear placement/roadblock optimization unit 502.

Figure 3:
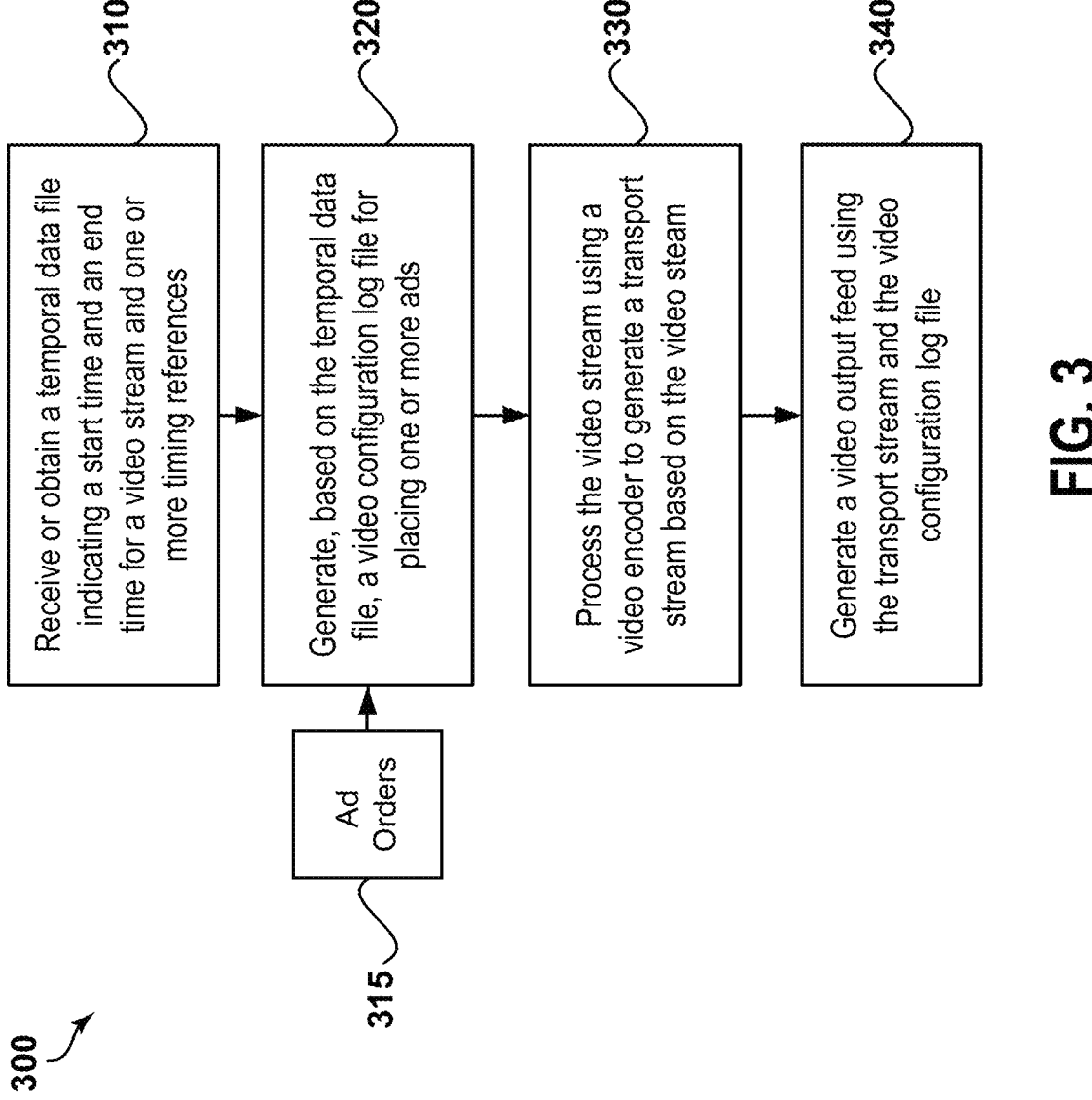
FIG. 3 illustrates an example process performed by the system in FIG. 1 to perform hybrid delivery of multicast video content in accordance with one embodiment.

FIG. 3 illustrates an example process 300 performed by the system in FIG. 1 to perform hybrid delivery of multicast video content in accordance with one embodiment.

At operation 310, the system 100 may receive or obtain a temporal data file indicating a start time and an end time for a video stream and one or more timing references, each of the timing references indicating a respective position in the video stream for advertisement placement.

The temporal data file may include, for example, data representing a temporal schedule that includes timing references used to direct when certain events, ads, fragments or other portions of a video are located temporally in a stream (e.g., to delay an ad by 2 seconds). In some embodiments, timing references are implemented to enable the manipulation of time in order to meet the output (delivery) requirements. Content can be delivered by reference either through a dependent proxy file, or through description in a playlist or manifest. When content is delivered by reference, the system can request for the content from a remote server at that reference before it receives the actual content. Content can be delivered by any number of protocols such as ftp, http, or other protocol in a timing manner where the result is indistinguishable from live. Content can be delivered by any number of protocols such as ftp, http, or other protocols in a manner that emulates a file delivery. Content can be provided as encrypted or unencrypted.

At operation 320, the system 100 may receive or obtain a plurality of advertisement orders 315, and generate, based on the temporal data file, a video configuration log file for dynamic insertion of one or more of the plurality of advertisement orders into the video stream.

At operation 330, the system 100 may process the video stream using a video encoder to generate a transport stream based on the video stream, the transport stream comprising one or more data markers for placements of one or more advertisements.

In some embodiments, the one or more data markers comprise Digital Program Insertion Cueing Message for Cable (SCTE) 35 markers.

In some embodiments, in response to the one or more data markers, a broadcast manifest is updated to include one or more advertisement placements within the video output feed.

In some embodiments, the system may include a multicast manifest manipulator unit 701 and wherein the broadcast manifest is configured by the multicast manifest manipulator unit 701.

In some embodiments, the multicast manifest manipulator unit 701 is only called a number of times equal to a number of target aggregate audience groups.

In some embodiments, the system may include a unicast manifest manipulator unit 702 and wherein the broadcast manifest is configured by the unicast manifest manipulator unit 702.

At operation 340, the system 100 may generate a video output feed using the transport stream and the video configuration log file.

In some embodiments, the system may include a video delivery system for dynamic delivery of the video output feed using the broadcast manifest.

In some embodiments, the video delivery system is configured to display one or more of the plurality of advertisement orders in the video output feed based on the broadcast manifest.

In some embodiments, the multicast manifest manipulator unit 701, in response to the one or more data markers, is configured to make an IAB Video Ad Serving Template (VAST) or Video Multiple Ad Playlist (VMAP) ad request.

In some embodiments, the multicast manifest manipulator unit 701 is configured to update the broadcast manifest based on one or more advertisement selections received in response to the IAB VAST or IAB VMAP ad request.

Figure 4:
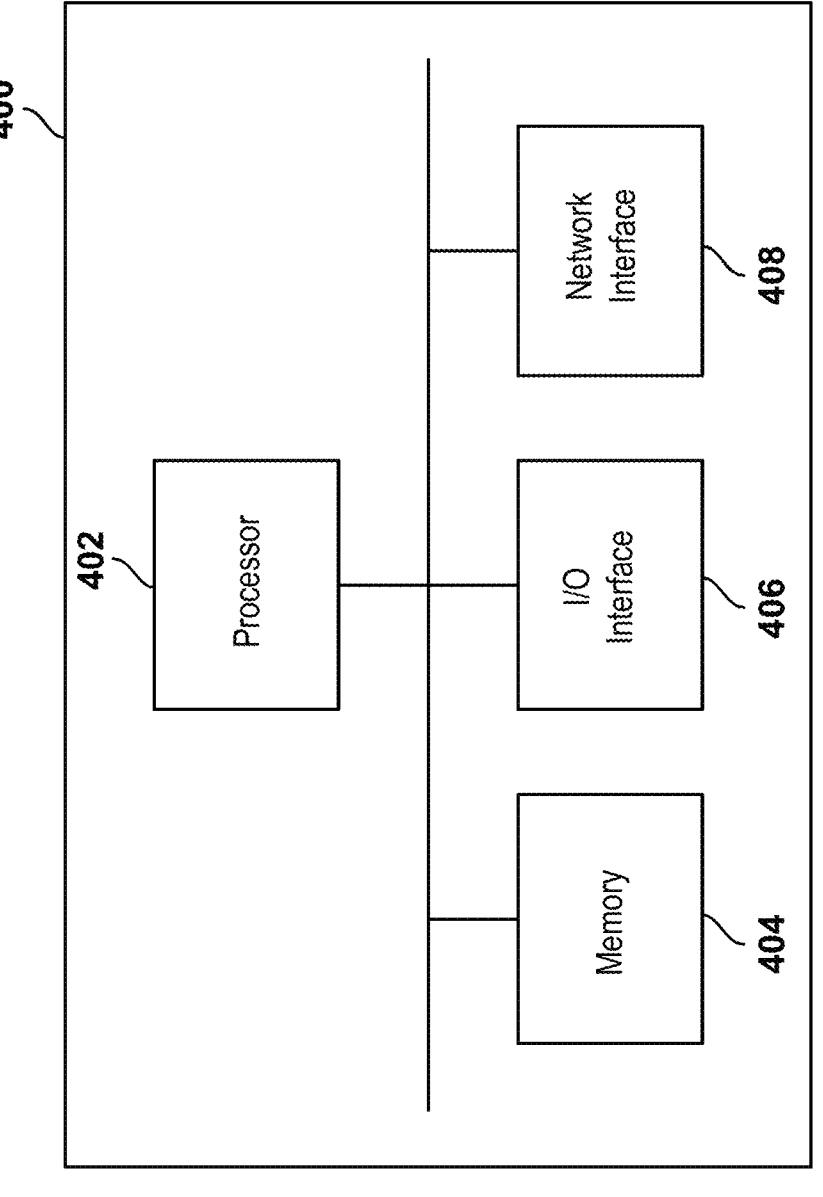
FIG. 4 is a schematic diagram of a computer system that may be used to implement the system in FIG. 1, in accordance with one embodiment.

Referring now to FIG. 4, which shows a computer system 400 that is specifically configured and implemented to execute and operate an example video processing system 100 in accordance with some embodiments.

A processing device 402 can execute instructions in memory 404 to configure various system units as shown in FIG. 2 and FIG. 3. A processing device 402 can be, for example, a type of microprocessor or microcontroller, a digital signal processing (DSP) processor, an integrated circuit, a field programmable gate array (FPGA), a reconfigurable processor, or a combination thereof.

Each I/O unit 406 enables the system to interconnect with one or more input devices, such as a keyboard, mouse, camera, touch screen and a microphone, or with one or more output devices such as a display screen and a speaker.

Each communication interface 408 enables the system 400 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

Memory 404 may include storage that may be configured to store information associated with the video processing units. Storage and/or persistent storage may be provided using various types of storage technologies, such as solid state drives (SSD), hard disk drives, flash memory, and may be stored in various formats, such as relational databases, non-relational databases, flat files, spreadsheets, extended markup files, etc.

Present disclosure provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

The invention claimed is:

1. A computer-processor-implemented video processing system, comprising:
a processor;
a non-transitory data storage device storing a set of instructions, when executed by the processor, causes the system to:
receive or obtain a temporal data file indicating a start time and an end time for a video stream and one or more timing references, each of the timing references indicating a respective temporal position in the video stream for advertisement placement;
receive or obtain a plurality of advertisement orders;
generate, based on the temporal data file, a video configuration log file for dynamic insertion of one or more of the plurality of advertisement orders into the video stream, the video configuration log file comprising one or more data markers for placements of one or more advertisements;
process the video stream using a video encoder to generate a transport stream based on the video stream, the transport stream comprising the one or more data markers for placements of one or more advertisements, wherein each of the data markers include a data signal used to identify a temporal splice point in the transport stream for placement of additional content, wherein the transport stream is populated with the one or more advertisements based on the video configuration log file once for each target aggregate audience group of a plurality of target aggregate audience groups, wherein the video encoder further enables manipulation of the transport stream for synchronization of captioning and expansion of transport stream length to meet video output feed requirements; and
generate a video output feed using the transport stream and the video configuration log file.

2. The system of claim 1, wherein the one or more data markers comprise Digital Program Insertion Cueing Message for Cable (SCTE) 35 markers.

3. The system of claim 1, wherein in response to the one or more data markers, a broadcast manifest is updated to include one or more advertisement placements within the video output feed.

4. The system of claim 3, further comprising a multicast manifest manipulator unit and wherein the broadcast manifest is configured by the multicast manifest manipulator unit.

5. The system of claim 3, further comprising a unicast manifest manipulator unit and wherein the broadcast manifest is configured by the unicast manifest manipulator unit.

6. The system of claim 3, further comprising a video delivery system for dynamic delivery of the video output feed using the broadcast manifest.

7. The system of claim 3, wherein the multicast manifest manipulator unit, in response to the one or more data markers, is configured to generate an ad request.

8. The system of claim 4, wherein the multicast manifest manipulator unit is only called a number of times equal to a number of target aggregate audience groups.

9. The system of claim 7, wherein the multicast manifest manipulator unit is configured to update the broadcast manifest based on one or more advertisement selections received in response to the ad request.

10. The system of claim 9, wherein the broadcast manifest comprise embedded data to improve decision making with respect to ad selection and placements.

11. A computer-process-implemented method for video processing, the method comprising:

receiving or obtaining a temporal data file indicating a start time and an end time for a video stream and one or more timing references, each of the timing references indicating a respective position in the video stream for advertisement placement;

receiving or obtaining a plurality of advertisement orders;

generating, based on the temporal data file, a video configuration log file for dynamic insertion of one or more of the plurality of advertisement orders into the video stream, the video configuration log file comprising one or more data markers for placements of one or more advertisements;

processing the video stream using a video encoder to generate a transport stream based on the video stream, the transport stream comprising one or more data markers for placements of one or more advertisements, wherein each of the data markers include a data signal used to identify a temporal splice point in the transport stream for placement of additional content, wherein the transport stream is populated with the one or more advertisements based on the video configuration log file once for each target aggregate audience group of a plurality of target aggregate audience groups, wherein the video encoder further enables manipulation of the transport stream for synchronization of captioning and expansion of transport stream length to meet video output feed requirements; and generating a video output feed using the transport stream and the video configuration log file.

12. The method of claim 11, wherein the one or more data markers comprise Digital Program Insertion Cueing Message for Cable (SCTE) 35 markers.

13. The method of claim 11, further comprising, in response to the one or more data markers, updating a broadcast manifest to include one or more advertisement placements within the video output feed.

14. The method of claim 13, further comprising configuring the broadcast manifest using a multicast manifest manipulator unit.

15. The method of claim 13, further comprising configuring the broadcast manifest using a unicast manifest manipulator unit.

16. The method of claim 13, further comprising delivering the video output feed using the broadcast manifest.

17. The method of claim 13, wherein the multicast manifest manipulator unit, in response to the one or more data markers, is configured to generate an ad request.

18. The method of claim 14, wherein the multicast manifest manipulator unit is only called a number of times equal to a number of target aggregate audience groups.

19. The method of claim 17, wherein the multicast manifest manipulator unit is configured to update the broadcast manifest based on one or more advertisement selections received in response to the ad request.

20. The method of claim 19, wherein the broadcast manifest or data markers comprise embedded data to improve decision making with respect to ad selection and placements.

* * * * *